United States Patent [19]
Carlson et al.

[11] Patent Number: 5,004,077
[45] Date of Patent: Apr. 2, 1991

[54] ELECTROMECHANICAL PARKING BRAKE SYSTEM

[75] Inventors: Harold L. Carlson, Moberly; Michael D. DeWitt, Columbia; Louis Martel, Jr., Moberly; Larry W. Kelley, Salisbury; Jeffrey E. Tayon, Moberly, all of Mo.

[73] Assignee: Orscheln Co., Moberly, Mo.

[21] Appl. No.: 406,549

[22] Filed: Sep. 13, 1989

[51] Int. Cl.⁵ .............................................. B60T 1/00
[52] U.S. Cl. ............................. 188/2 D; 74/501.5 R; 49/360; 188/162
[58] Field of Search ............... 188/162, 2 D, 161, 158, 188/196 R; 74/501.5 R, 89.18, 89.2, 89.21; 192/1.39, 1.37, 111 R, 35, 9; 49/360, 352

[56] References Cited

U.S. PATENT DOCUMENTS

| | | |
|---|---|---|
| 2,679,392 | 5/1954 | Brundage . |
| 2,734,590 | 2/1956 | Hays, Jr. ........................ 188/162 X |
| 2,829,885 | 4/1958 | Russell . |
| 2,899,022 | 8/1959 | White .............................. 188/162 X |
| 3,353,634 | 11/1967 | Farrar ............................ 188/162 X |
| 3,392,488 | 7/1968 | Werner . |
| 3,539,038 | 5/1968 | Taber . |
| 4,265,345 | 5/1981 | Fasano . |
| 4,534,233 | 8/1985 | Hamaguchi . |
| 4,561,527 | 12/1985 | Nakamoto et al. ................ 192/4 C |
| 4,629,043 | 12/1986 | Matsuo et al. . |
| 4,662,236 | 5/1987 | Kobayashi ....................... 49/352 X |
| 4,753,125 | 6/1988 | Fukumoto et al. ............... 49/352 X |
| 4,795,002 | 1/1989 | Burgei et al. . |
| 4,813,304 | 3/1989 | Kobayashi ..................... 74/501.5 R |
| 4,841,798 | 6/1989 | Porter et al. .................. 74/501.5 R |
| 4,889,007 | 12/1989 | Seft et al. ................. 74/501. 5 R X |

Primary Examiner—Douglas C. Butler
Attorney, Agent, or Firm—Laubscher, Presta & Laubscher

[57] ABSTRACT

An electromechanical parking brake system is provided including an electric driving gear motor connected with a parking brake cable track member by a releasable connection, preferably in the form of a pawl and ratchet arrangement. In accordance with one feature of the invention, a manually-operable override device is provided for disengaging the pawl from the ratchet, thereby to disconnect the electric drive motor. According to another feature, the pawl is automatically disengaged from the ratchet when the cable track member is in the brake-released condition, so that a cable-tensioning device is actuated to remove slack from the parking brake cable.

8 Claims, 4 Drawing Sheets

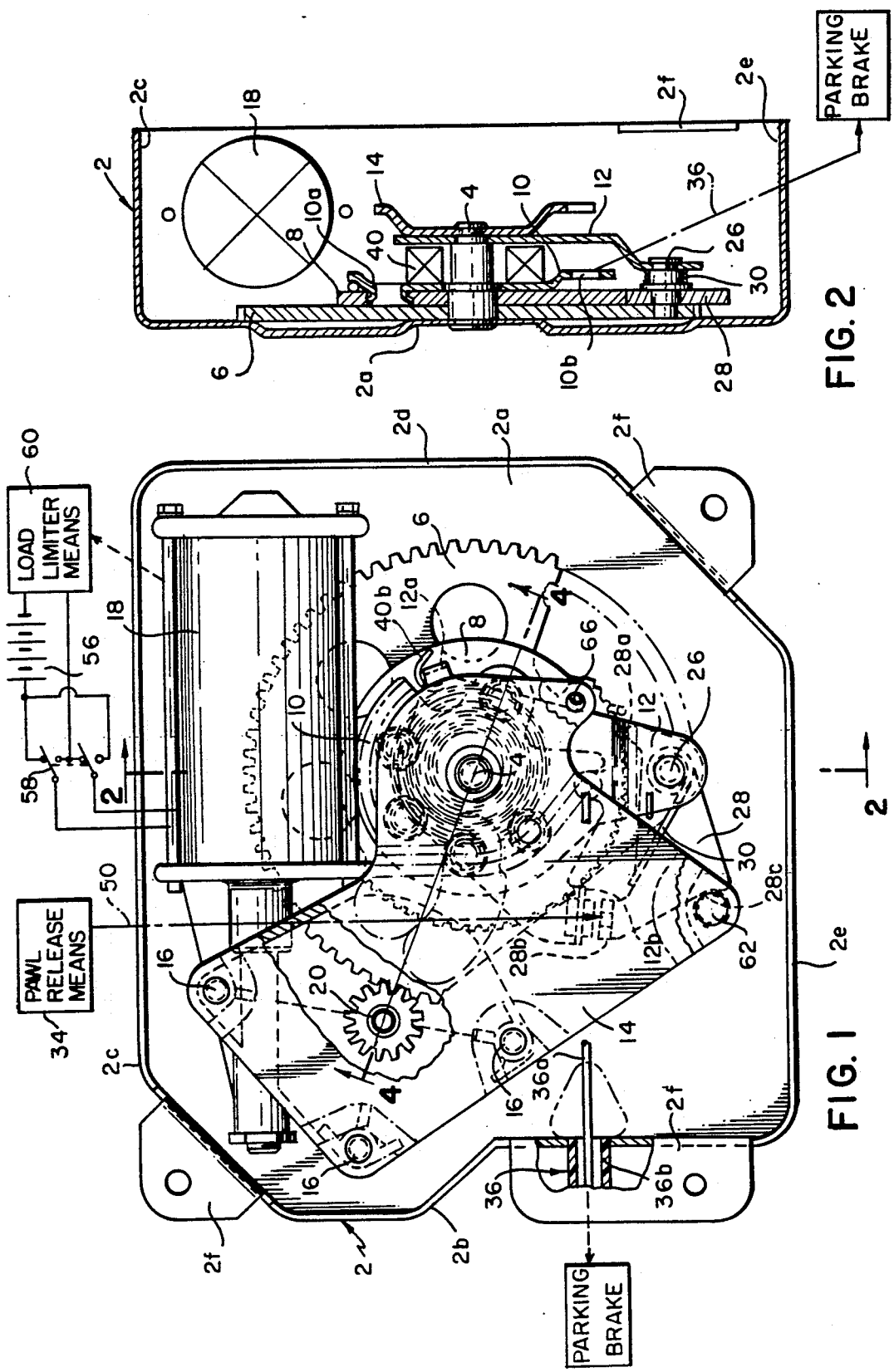

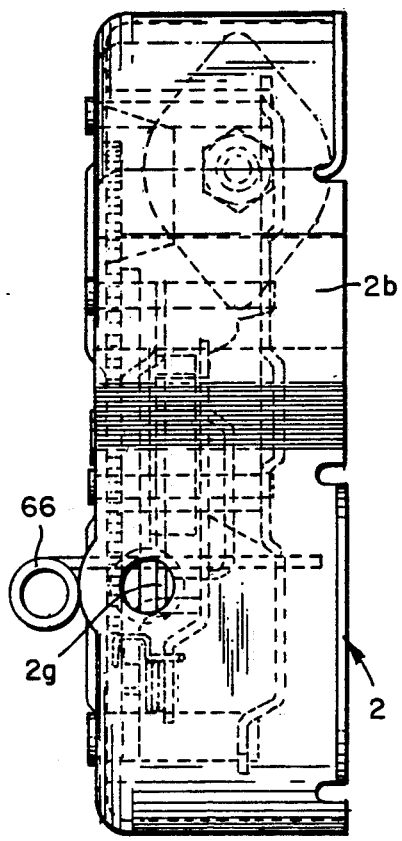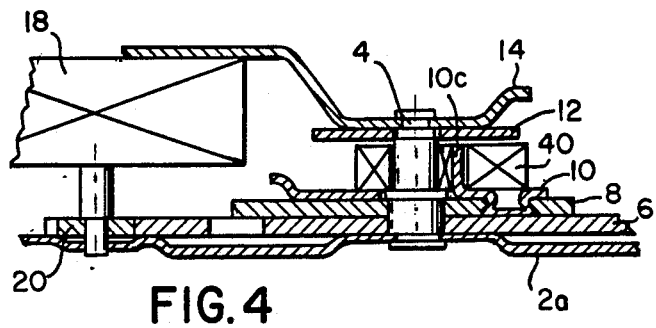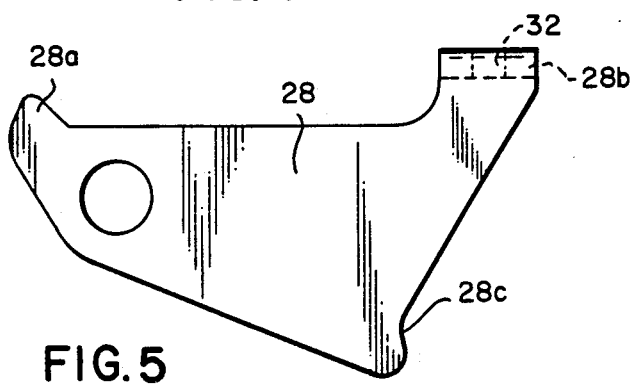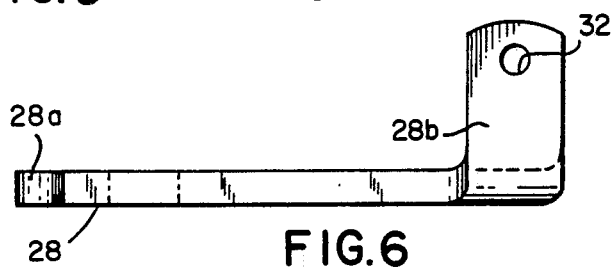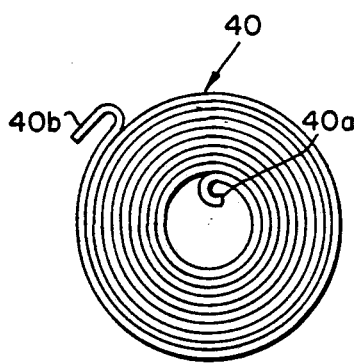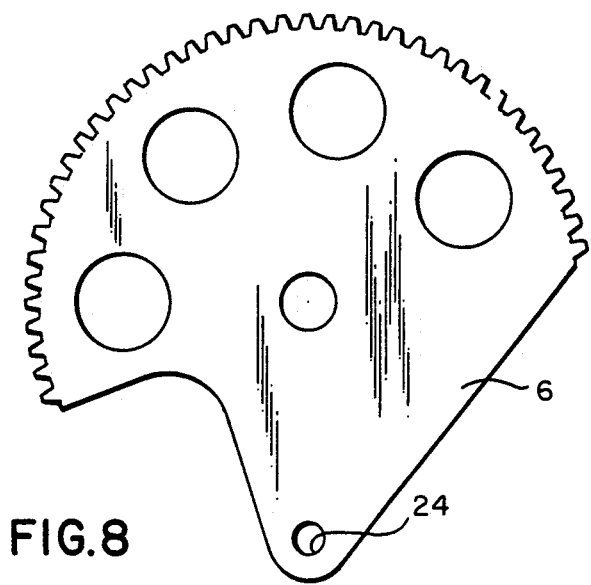

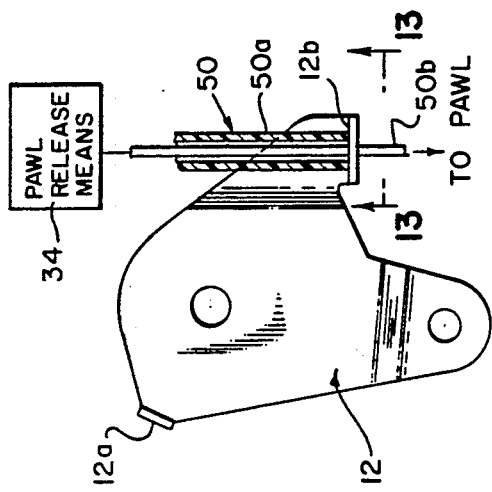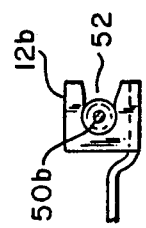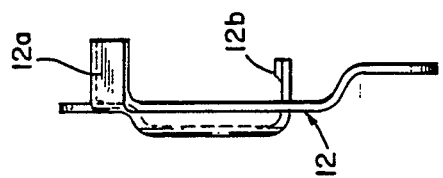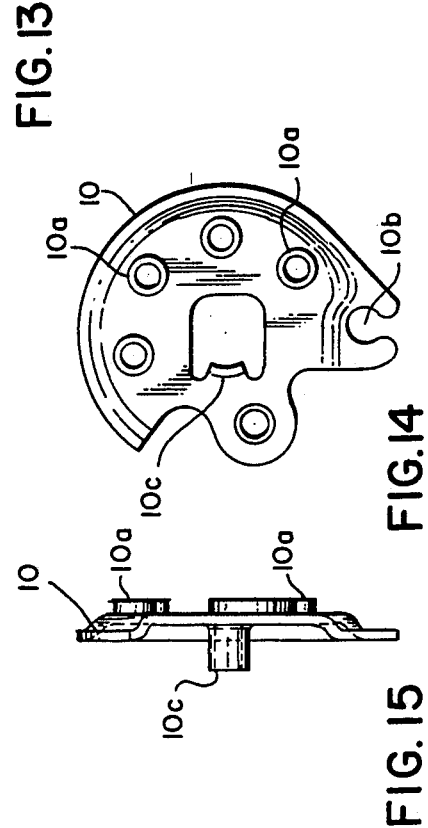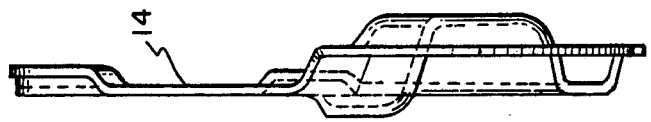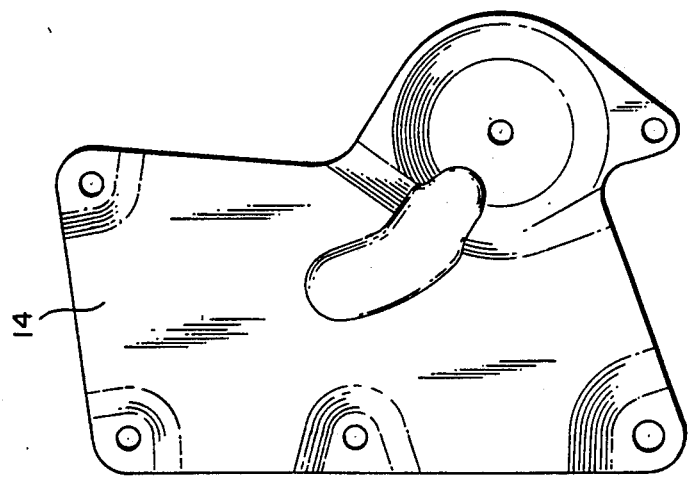

ELECTROMECHANICAL PARKING BRAKE SYSTEM

STATEMENT OF THE INVENTION

An electromechanical parking brake system is disclosed including releasable means operable to disconnect an electric drive motor from a parking brake cable track member.

BRIEF DESCRIPTION OF THE PRIOR ART

Electromechanical parking brake systems are known in the prior art in which electric motor means are used in connection with the operation of the parking brake of a motor vehicle. Examples of such known systems are presented by the patents to Masayoshi Matsuo et al U.S. Pat. No. 4,629,043, and Taber et al U.S. Pat. No. 3,539,038. Furthermore, the use of a solenoid to release the pawl of a parking brake system is disclosed in the prior patent to Fasano U.S. Pat. No. 4,265,345.

One problem in such known systems resides in the difficulty in providing manual override in the known systems, whereby the electric drive motor may be manually disconnected from the parking brake cable. Another problem is that of removing slack from the parking brake cable.

The present invention was developed to provide an improved, durable, relatively-inexpensive parking brake system which avoids the above and other drawbacks of the known electromechanical parking brake systems.

SUMMARY OF THE INVENTION

A primary object of the invention is to provide an improved parking brake system of the electromechanical type including releasable means for disconnecting the electric drive gear motor from the parking brake cable track member. In the preferred embodiment, these releasable means comprise pawl and ratchet means which are normally relatively biased toward an engaged condition. The pawl is connected with a gear sector driven by the electric drive gear motor, and the ratchet is connected with the cable track member.

A more specific object of the invention is to provide manual override-means for operating the pawl to disconnect the drive motor from the parking brake cable track.

A further object of the invention is to provide means for automatically operating the pawl to disconnect the drive motor when the cable track member is in the brake disengaged condition, in combination with cable tensioning means for removing slack from the parking brake cable. A stationary release ramp on the housing of the system releases the pawl to permit a spiral spring to operate the cable track member in a direction to remove cable slack.

According to a more detailed object of the invention, the parking brake system is driven by an electric right angle drive gear motor. The output shaft of the gear motor is provided with a pinion gear which engages a larger spur gear sector that carries a pawl. The pawl remains engaged to a ratchet on the cable track member during normal modes, allowing load transfer through the pawl to the ratchet. The cable track fixed to the ratchet permits application and release of cable tension. The system mechanically maintains tension until released. At full system release, the pawl is disengaged and the system is automatically adjusted. A manual release override, as a backup for electrical failure, is provided by disengaging the pawl by suitable release means, such as a cable, while the system is in the applied mode.

To apply the parking brake, the user pushes the parking brake apply button which activates the gear motor. The gear motor rotates the pinion and thus rotates the gear sector. The pawl engages the ratchet as its tail comes off of a release ramp. The ratchet and cable track assembly rotate until a specified current flow level is reached, as determined by the desired load level at the rear brake assemblies. The gear motor circuit is then opened, eliminating additional travel of the system. System back-driving is prevented and mechanical hold is maintained through the worm gear reduction drive. Specifically, the worm lead angle is small enough to prevent back-driving.

To release the parking brake system, the user pushes the parking brake release button. The gear motor polarity is reversed, whereupon the gear motor operates in reverse, thus reversing the gear sector and pawl. Cable tension is released as the ratchet and cable track assembly rotate in the reverse direction. As the ratchet approaches the end of its travel, the pawl contacts the release ramp and disengages from the ratchet. The spur gear sector contacts a bumper, increasing the load at the gear motor. As this load reaches a predetermined level, the circuit opens.

In the event of electrical failure while the system is applied, the system may be released mechanically. To this end, there is attached to the tail of the pawl a release means (such as a cable or a mechanical linkage) which is routed into the passenger compartment. Upon pulling of the release means, the pawl is disengaged, thereby releasing brake cable tension.

As the system approaches the end of its release travel, the tail of the pawl makes contact with the release ramp, thereby disengaging the pawl from the ratchet. The ratchet and cable track assembly then free-floats against the tension of a spiral torsion spring. The tension of this spring is regulated according to the parking brake system requirement for residual parking brake system tension. Automatic adjustment is provided by the pretensioned spiral torsion spring at the vehicle assembly plant.

According to one important advantage of the invention, no physical effort is required to operate the system, thereby making it suitable for use by handicapped, elderly or petite persons. Another advantage is that more packaging options are provided, since the system can be mounted anywhere on the vehicle. Furthermore, a more controlled emergency braking system is possible by using the electromechanical parking brake system of the present invention.

BRIEF DESCRIPTION OF THE DRAWINGS

Other objects and advantages of the invention will become apparent from study of the following specification when viewed in the light of the accompanying drawing in which:

FIG. 1. is a partially broken away side elevational view of the electromechanical parking brake system of the present invention;

FIG. 2 is a sectional view taken along line 2—2 of FIG. 1;

FIG. 3 is an end view of the apparatus of FIG. 1;

FIG. 4 is a sectional view taken along line 4—4 of FIG. 1;

FIGS. 5 and 6 are side elevation and top plan detail views, respectively, of the pawl component of FIG. 1;

FIGS. 7 and 8 are side elevational views of the spiral cable tension spring and the gear sector components of the system of FIG. 1;

FIGS. 9 and 10 are side elevational and end views, respectively, of the cover component of the system of FIG. 1;

FIGS. 11 and 12 are side elevation and end views, respectively, of the stabilizer bar, and FIG. 13 is a detailed view taken along line 13—13 of FIG. 11;

FIGS. 14 and 15 are side elevation and end views, respectively, of the cable track member;

DETAIL DESCRIPTION

Figure 18:
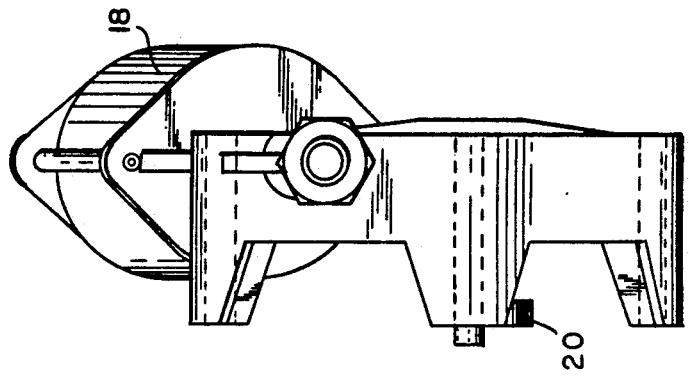
FIG. 18 is an end view taken along line 18—18 of FIG. 17.

Referring first more particularly to FIGS. 1-4, the electromechanical parking brake system of the present invention includes a rigid housing 2 including a bottom wall 2a and four side walls 2b, 2c, 2d, and 2e. Rigidly secured at one end to the housing bottom wall 2a is a main pivot pin or rivet 4 upon which are rotatably mounted a gear sector 6, a ratchet 8, a parking brake cable track member 10, and a stabilizer bar 12. The housing 2 is provided with outwardly extending end portions 2f by means of which it may be bolted to any convenient location on a motor vehicle, as desired. Cover plate 14, which contains an opening for supporting the free end of the rivet 4, as shown in FIG. 2, is secured to the housing bottom wall 2a by fasteners 16, such as rivets or bolts.

Figure 16:
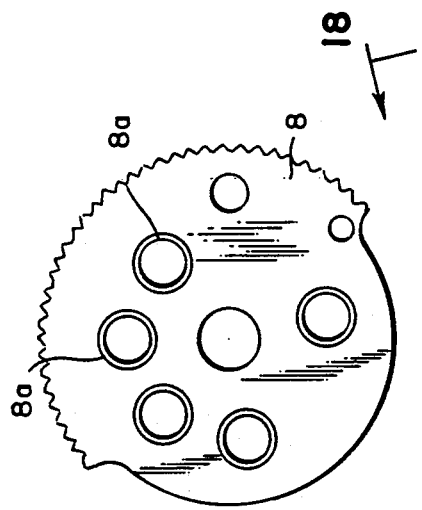
FIG. 16 is a side elevational view of the ratchet member.
Figure 17:
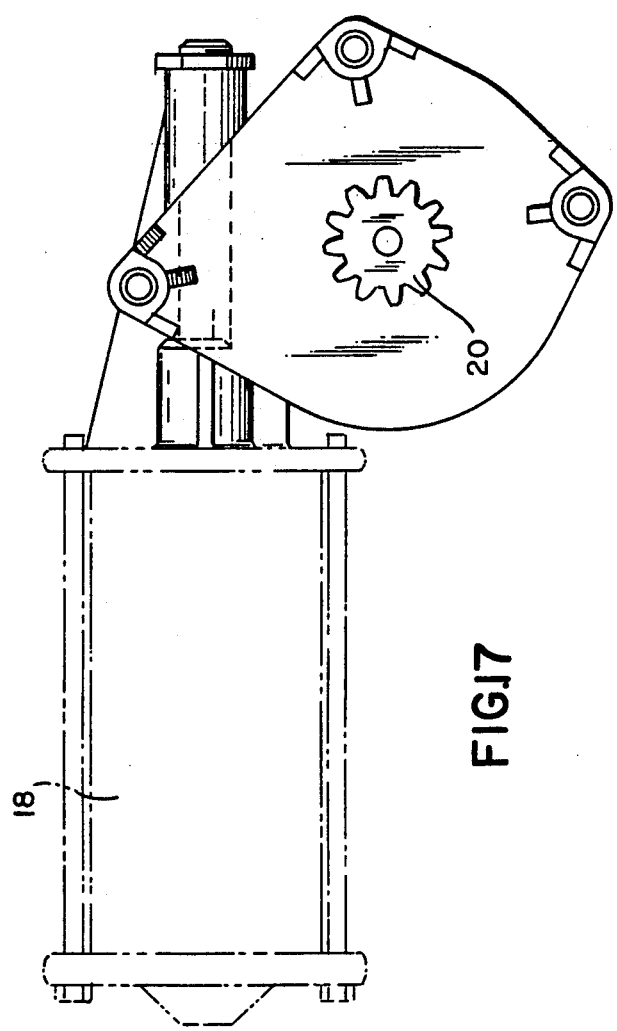
FIG. 17 is a side elevational view of the electric view of the electric drive motor assembly.

Also fastened by bolts or rivets to the bottom wall 2a is an electric gear motor 18 (FIGS. 17 and 18) having a reduction gear box containing a worm gear for driving an output shaft upon which is mounted a pinion driving gear 20. As shown FIG. 1, the pinion driving gear is in engagement with the gear teeth of the gear sector 6. As shown in FIG. 8, the gear sector 6 contains an opening 24 that receives a pawl pivot shaft or rivet 26 upon which is pivoted a pawl 28 having a pawl tooth 28a that is normally biased into engagement with the teeth of ratchet 8 by pawl spring 30. As shown in FIGS. 5 and 6, the pawl 28 is provided with a laterally extending arm portion 28b containing an opening 32 for connection with pawl release means 34, as will be described below. The free end of the stabilizer bar 12 is mounted on the other end of the pawl pivot shaft 26, as shown in FIG. 2. The cable track member 10 (which is shown in detail in FIGS. 14 and 15), is rigidly secured to the ratchet 8 by means of deformed laterally extending annular portions 10a that are clinched within corresponding opening 8a contained in ratchet 8, as shown in FIG. 16. The cable track member 10 is provided with an opening 10b for connection with one end of the inner cable member 36a of the parking brake cable means 36, as shown in FIG. 1. The parking brake cable includes, as is customary in the art, an outer sleeve member 36b that is connected at one end of the opening 2g (FIG. 3) contained in housing sidewall 2b by a suitable cable fitting (not shown).

Concentrically mounted on the main pivot shaft 4 between the cable track member 10 and the stabilizer bar 12 is a spiral cable tension spring 40 having inner and outer extremities 40a and 40b, as shown in FIG. 7. Referring to FIGS. 4 and 15, the cable track member 10 is provided with a laterally extending tab portion 10c that is arranged for engagement by the inner end portion 40a of the spiral spring 40, and the stabilizer bar 12 is provided with a similar lateral tab portion 12a (FIG. 12), that is arranged for engagement by the bent outer extremity 40b of the spiral tension spring 40. As shown in FIGS. 11–13, the stabilizer bar 12 is also provided with a lateral tab portion 12b containing a central opening 52 for connection with the outer sleeve 50a of a coaxial release cable 50 the other end of which is connected with the manual override pawl release means 34. The inner cable member 50b extends through the opening 52 for connection with the opening 32 contained in arm portion 28b of the pawl 28.

As shown in FIG. 1, direct-current is supplied to the motor 18 from battery 56 (FIG. 1) via reversing switch means 58, the electrical circuit being provided with load limited means 60 that deactivate the motor when the current sent by the limited means exceeds the predetermined value.

OPERATION

In operation, assume that the parking brake apparatus is in the brake-disengaged condition of FIG. 1. To operate the parking brake, the reversing switch 58 is operated to reverse the supply of power to the electric gear motor 18, whereupon motor 18 is operated to drive the driving pinion 20 and thereby rotate the gear sector 6 (with pawl pivot shaft 26 and pawl 28 attached thereto) in the counter clockwise direction relative to the main pivot shaft 4. Pawl biasing spring 30 pivots pawl 28 in the counter clockwise direction about pawl pivot shaft 26, whereupon the pawl tooth 28a is brought into engagement with the teeth of ratchet 8. Since ratchet 8 and cable track 10 are now connected with the gear sector 6 by the pawl 28, further rotation of drive pinion 20 by the motor 18 causes cable track member 10 to rotate to tension the inner parking brake cable member 6a, thereby to apply the parking brakes to the vehicle. Owing to the increased tension in the parking brake cable when the parking brakes are applied, the current of electric gear motor 18 increases to the point that load limiter means 60 is operated to deactivate the electric gear motor 18, whereupon the gear drive means associated with the motor will maintain the parking brake in the engaged condition.

To disengage the parking brake, the reversing switch 58 is operated to reverse the polarity of the connections of the battery 56 to the electric gear motor 18, whereupon the pinion 20 is driven in the opposite direction to drive the gear sector 6, pawl 28, ratchet 8, and cable track member 10 in the opposite direction, thereby to relieve the tension in inner parking brake cable member 36a, thereby to disengage the parking brakes from the wheels of the vehicle. When the gear sector 6 rotates in the clockwise direction toward the position illustrated in FIG. 1, the external surface 28c of pawl 28 engages a stationary abutment 62 on the housing 2, thereby to terminate the extent of travel of the gear sector 6 in a clockwise direction. Owing to the cooperation with the stationary stop 62, pawl 28 is pivoted to disengage the pawl tooth 28 from the ratchet 8, whereupon the spiral spring 40 expands to rotate the cable track member 10 relative to stabilizing bar 12 and gear sector 6, thereby to remove slack from the parking brake cable.

In accordance with an important feature of the invention, manual override pawl release means 34 are provided for operating pawl 28 when the apparatus is in the brake engaged position. Thus, assuming that the gear sector 6 has been rotated in the counter clockwise direction in FIG. 1 to tension the inner cable member 36a to apply the parking brake, upon operation of the manual override pawl release means 4, pawl 28 is disengaged from the ratchet 8, whereupon the ratchet 8 and cable track member 10 are released for free rotation about the main pivot shaft 4, so that the tension in the cable rotates the cable track member 10 in the clockwise direction to release the parking brake. The pawl automatically resets the system when the unit is next operated in the reverse direction. During the initial installation of the parking brake system of the vehicle, owing to the provision of a lockout pin 66 (FIGS. 1 and 3), the tension spring 40 is maintained in a predetermined wound condition until the brake cable is connected with the cable track member 10. After the housing 2 has been mounted in place, the lock out pin 66 is removed and the tension spring 40 is allowed to take up the initial slack in the parking brake cable.

The parking brake system can be mounted anywhere within the vehicle and need not be adjacent the driver as required by prior parking brake control systems.

One example of a suitable gear box electrical motor for use in the parking brake system is the AMC Jeep Part No. 83503429, and a suitable reversing switch is AMC Jeep Part No. 56001526.

While in accordance with the provisions of Patent Statute the preferred form of the embodiments of the invention have been disclosed, it will be apparent that various changes may be made without deviating from the inventive concepts set forth above.

What is claimed is:

1. Parking brake apparatus for operating the parking brake cable of a vehicle between non-tensioned brake-released and tensioned brake-engaged condition, respectively, comprising:
    (a) a housing (2) provided with a stationary main pivot shaft (4);
    (b) an annular cable track member (10) journalled on said pivot shaft, said cable track member being adapted for connection with one end of the parking brake cable;
    (c) drive means for alternately rotating said cable track member in opposite directions on said pivot shaft toward brake-engaged and brake-released positions relative to said housing, respectively, said drive means including:
        (1) a gear sector member (6) rotatably mounted on said pivot shaft;
        (2) reversible electric gear motor means (18) connected with said housing and including an output shaft having a driving pinion (20) in enmeshing engagement with said gear sector member;
        (3) pawl ratchet means normally connecting said gear sector member with said cable track member, said pawl and ratchet means including:
            (a) a ratchet (8) connected with one of said cable track and sector members;
            (b) a pawl (28) pivotally connected with the other of said members; and
            (c) spring means (30) normally biasing said pawl toward engagement with said ratchet; and
        (4) means (58) for alternately operating said motor means in opposite directions, respectively; and
    (d) means (34,62) for releasing said pawl from said ratchet, thereby to disconnect said cable track member from said drive means.

2. Apparatus as defined in claim 1, wherein said pawl releasing means comprises manually-operable override means (34).

3. Apparatus as defined in claim 1, wherein said pawl releasing means includes means (62) on said housing for automatically releasing said pawl from said ratchet when said cable track member is in the brake-released position; and further including:
    (e) cable tension adjusting means (40) operable when said pawl and ratchet means is in the released condition for automatically removing slack from the parking brake cable.

4. Apparatus as defined in claim 3, and further including manually operable means for disengaging said pawl from said ratchet.

5. Apparatus as defined in claim 3, wherein said cable tension adjusting means includes a spiral tension spring mounted concentrically on said pivot shaft, and means connecting opposite ends of said tension spring with said cable track member and with said gear sector, respectively.

6. Apparatus as defined in claim 5, wherein said means connecting one end of said tension spring with said cable track member includes a tab portion extending axially from said cable track member.

7. Apparatus as defined in claim 6, and further including:
    (f) a stabilizer bar mounted between said main pivot shaft and said pawl pivot shaft, said means connecting the other end of said tension spring with said pawl including a tab portion extending from and normal to said stabilizer bar.

8. Apparatus as defined in claim 7, and further including:
    (g) means including coaxial cable means for manually disengaging said pawl from said ratchet, said cable means including an inner cable member connected at one end with said pawl, and an outer sleeve member connected at one end with said stabilizer bar.

* * * * *